(No Model.)
C. McCONALOGUE.
ROASTER AND BAKER.
No. 475,946. Patented May 31, 1892.
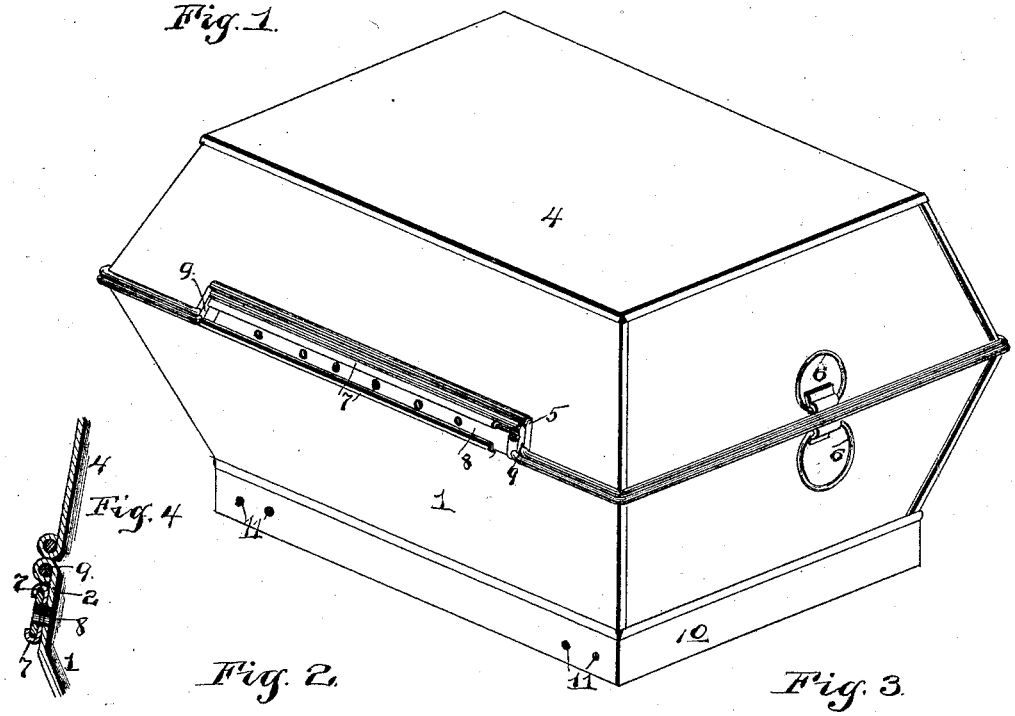
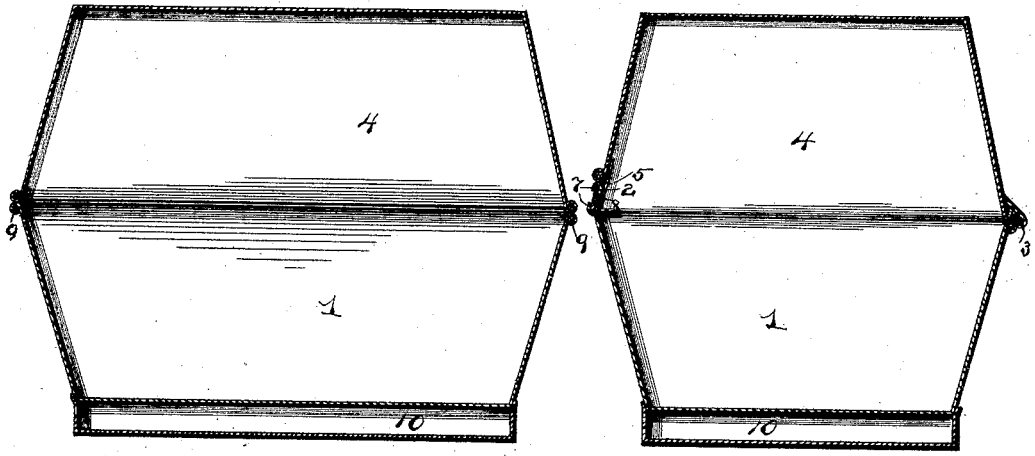
Witnesses:
J. G. Seitz
W. S. Duvall
Inventor
Charles McConalogue
By his Attorneys,
C. A. Snow & Co.

UNITED STATES PATENT OFFICE.

CHARLES McCONALOGUE, OF CHEBOYGAN, MICHIGAN

ROASTER AND BAKER.

SPECIFICATION forming part of Letters Patent No. 475,946, dated May 31, 1892.

Application filed June 25, 1891. Serial No. 397,487. (No model.)

*To all whom it may concern:*

Be it known that I, CHARLES MCCONALOGUE, a citizen of the United States, residing at Cheboygan, in the county of Cheboygan and State of Michigan, have invented a new and useful Roaster and Baker, of which the following is a specification.

This invention relates to improvements in cooking-pans for baking bread, meat, popping corn, roasting coffee, or cooking other edibles.

It is well known that certain articles—for instance, meat—require to be cooked in a closed vessel, while other articles—such as bread and cakes—require ventilation to insure proper cooking.

The object of my invention is to provide a cheap and simple construction of pan adapted to meet the above requirements, and also to be so constructed as to provide for an equalization of heat over the entire surface of the article being cooked, so that a uniform browning is given the article and all basting by hand is avoided.

With the above objects in view my invention consists in certain features of construction hereinafter specified, and particularly pointed out in the claims.

Referring to the drawings, Figure 1 is a perspective of a pan constructed in accordance with my invention. Fig. 2 is a vertical longitudinal section of the same. Fig. 3 is a transverse section thereof. Fig. 4 is an enlarged detail in cross-section through the two front meeting edges of the pan.

Like numerals of reference indicate like parts in all the figures of the drawings.

In practicing my invention I employ a main receiving-pan 1, of ordinary form with the exception that at its front edge it is provided with a central vertical perforated flange 2, said perforations being disposed longitudinal with the flange. To the rear edge or back of the pan I hinge, as at 3, an inverted pan 4, serving as a cover to the first-mentioned pan and provide the same at its front lower edge with a recess 5, designed to receive and loosely fit the flange 2. Each of the pans is provided with suitable rings 6, by which they may be handled, and, if desired, the perforated flange may be duplicated at the back of the pan, as will be obvious.

The perforated flange is provided at its upper and lower sides with ways 7, and in the same is mounted for movement a perforated strip 8, the perforations being coincident with those of the flange, and by moving the strip toward the ends of the flange the perforations of the strip may be brought into alignment with those of the flange or thrown out of such alignment. The meeting edges of the pans are beaded, as shown, the bead 9 of the lower pan serving as a stop for the strip, so that when the strip is brought in contact with the stop at one end of the flange the perforations align and when at the opposite edge they are out of alignment and closed.

The bottom of the lower pan is fitted within the upper edges of the surrounding walls of a bottom pan 10, the latter serving, in connection with the bottom of the lower pan 1, to form an intermediate air-space, through which a circulation is maintained by means of perforations 11, a pair of which is located at the front side and near each corner of the pan 10.

By reason of the air-space the article within the pan is prevented from too-rapidly cooking through the direct contact of the bottom of the pan 1 with the heat of the stove, and it will be obvious that the heat will be diffused and equalized throughout the pan and the surface of the article.

When cooking meats and such other articles as require to be closed in order to retain their flavor, the perforated strip is moved to a closed position, and hence by my invention I require no basting or other handling in order to insure a proper browning and a rich juicy roast. In cooking bread, cakes, or other similar articles where considerable ventilation is necessary the strip is moved so that the perforations are open and a thorough ventilation takes place. I thus avoid non-uniform browning or the formation of any dry hard crusts and produce as a result a beautifully-browned loaf, the crust of which is soft.

Having described my invention, what I claim is—

1. The herein-described pan, comprising a lower pan 1 and a bottom pan 10, the pan 1 being fitted upon the lower pan and the latter provided with circulation-openings and said lower pan being provided with a removable cover and with ventilating-openings, substantially as specified.

2. The herein-described pan, consisting of the upper inverted and the lower pans, the two hinged together at one of their meeting edges, the upper pan being provided with a recess at the center of one of its edges and the lower pan with a vertically-disposed flange perforated and extending into the recess and at opposite sides thereof having ways, and a perforated strip mounted for movement in the ways, substantially as specified.

3. The herein-described pan, having the inverted cover hinged thereto and having its upper edge beaded and upwardly extended at its center and perforated to form a flange, at each side of which are located ways, the upper pan being provided with a recess for the reception of the flange, and the perforated strip mounted for movement in the ways between the beads of the lower pan, whereby when thrown against one bead the perforations are in alignment and when thrown against the opposite bead said perforations are out of alignment and closed, substantially as specified.

In testimony that I claim the foregoing as my own I have hereto affixed my signature in presence of two witnesses.

CHARLES McCONALOGUE.

Witnesses:
GEORGE McKENZIE,
J. FRANK McGUIRE.